H. M. REYNOLDS.
REINFORCED LATHE CHUCK.
APPLICATION FILED APR. 29, 1909.
960,705.
Patented June 7, 1910.
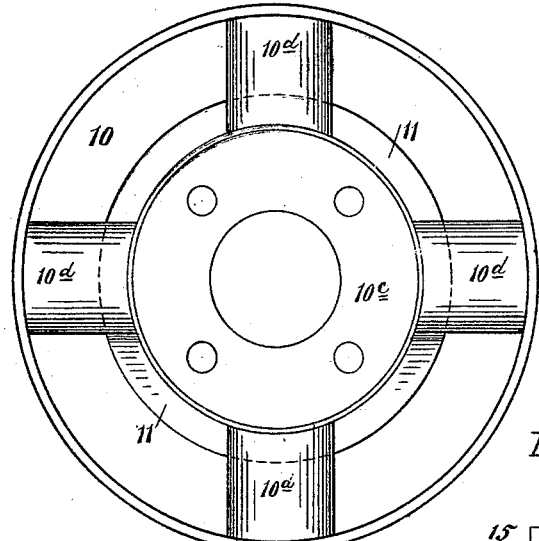
Fig-2-
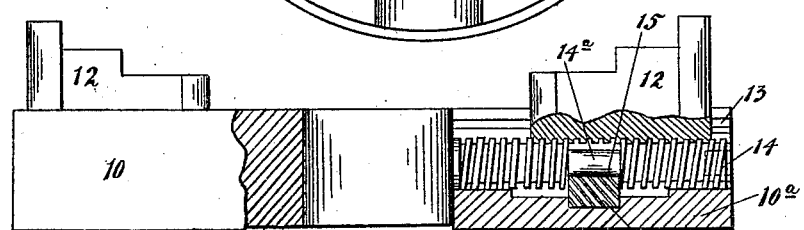
Fig-3-
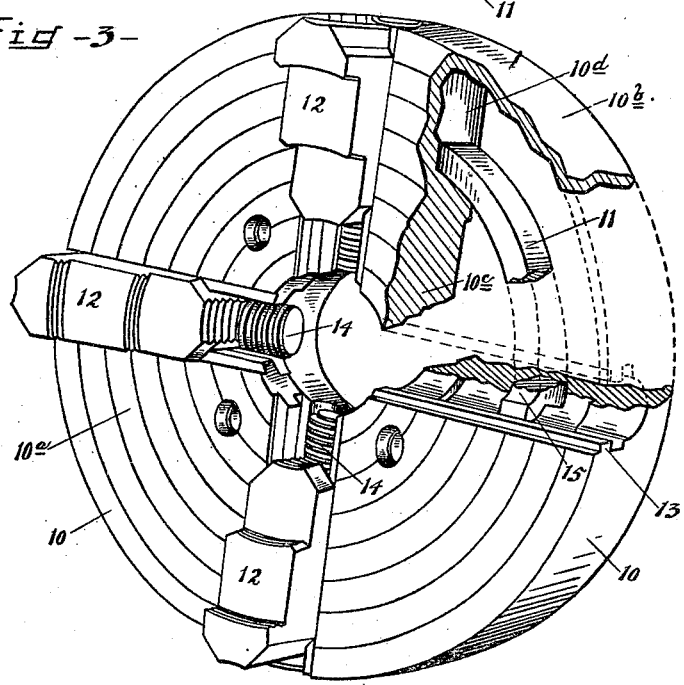
Fig-1-
Witnesses
Chas. A. Yardell
Sarah E. Clark
Inventor
HERMON M. REYNOLDS
By Robinson, Martin & Jones
Attorneys

UNITED STATES PATENT OFFICE.

HERMAN M. REYNOLDS, OF ONEIDA, NEW YORK.

REINFORCED LATHE-CHUCK.

960,705.   Specification of Letters Patent.   Patented June 7, 1910.

Application filed April 29, 1909. Serial No. 492,840.

*To all whom it may concern:*

Be it known that I, HERMAN M. REYNOLDS, of Oneida, in the county of Madison and State of New York, have invented certain new and useful Improvements in Reinforced Lathe-Chucks; and I do hereby declare that the following is a full, clear, and exact description thereof, which will enable others skilled in the art to which it appertains to make and use the same, reference being had to the accompanying drawings, and to the characters of reference marked thereon, which form part of this specification.

The object of my present invention is to provide a lathe chuck, which embodies all the necessary strength to resist strains and breakage, and is still cheaply manufactured both so far as cost of material and machine work is concerned.

Figure 1 shows a perspective view of a lathe chuck embodying the features of my present improvements, a section being broken out to better illustrate the construction. Fig. 2 is a rear or back view of the chuck. Fig. 3 is a partial longitudinal section on a line of one of the jaws.

Referring to the reference letters and figures in a more particular description, 10 indicates the chuck body, which is of a circular form, having a plate-like face $10^a$ and a rearwardly projecting flange $10^b$, a center or hub portion $10^c$ and radial spoke-like parts $10^d$ extending from the hub portion to the flange portion. The reinforcing ring 11 surrounds the hub portion of the chuck body and is embedded in the radial portions $10^d$, having exposed sections extending between the radial portions. The ring 11 is of some strong metal, preferably steel, and is introduced into the body of the chuck, which is preferably of cast iron, during the process of casting, the ring being laid in the mold, whereby the body of the chuck, which is preferably of cast iron, is formed in, around and about it. The exposed sections of the ring allow it to be advantageously supported in the mold during the process of casting and reduces the area of contact between the molten metal and the ring to such an extent that expansion and contraction do not become detrimental and destructive forces in the process.

In the face of the chuck preferably registering with the spoke or radial parts $10^d$ are the usual radial recesses receiving the sliding jaws 12. These jaws slide or run on ribs or ways as 13, whereby they are guided and directed. In the bottom of the recess in the face of the body which receives the jaws is located the jaw adjusting screws 14. These screws consist of two threaded sections connected by an integral neck section $14^a$, which section fits and runs in a U-shaped bearing 15 formed preferably in the side of the reinforcing ring 11 toward the face $10^a$, the shoulders at each side of the neck $14^a$ abutting against the sides of the ring and holding the screw accurately against longitudinal displacement. The extreme ends of the screw will preferably be supported against rocking movement in or over the bearing 15 by resting in seats in the bottom of the jaw groove. The underside of the jaws are provided with a part of a screw-thread adapted to engage with the threads of the screw, whereby as the screw is rotated the jaw is adjustably moved inwardly or outwardly with reference to the center with much power or force. The length of the screw-threaded face on the underside of the jaw is considerably greater than the length of the connecting neck $14^a$, whereby the jaw is enabled to pass the neck portion of the screw and still retain sufficient engagement with the screw for all practicable purposes. Each of the screws 14 will preferably be provided with a square socket in their outer ends to receive a wrench having a square bit. The length of the jaws where they engage the slide and where they engage the screw is such as to allow the outer ends of the jaws to project when desired to some little distance beyond the periphery of the body without losing their effective support and control, thus increasing the capacity of the chuck considerably.

While in the drawings only one reinforcing ring is shown, it is manifest that on larger chucks particularly more than one reinforcing ring could be introduced into the construction, and it is evident that the relative cross-sectional area of the ring could be considerably increased from that shown in the drawings.

Chucks of the general character herein shown and described made entirely of cast iron or other cast metal are liable to break or spread on the diametrical line through the recess in which the bases of the jaws are located and operate. All steel or wrought metal bodies are exceedingly difficult and expensive to machine rapidly and accurately, while cast iron bodies are machined accurately and rapidly with facility. In the construction of chuck herein shown the bulk of the cutting and machining for the jaws and screw is in the cast iron, and a very small amount of cutting and machining on the tough metal found in the ring is required. Thus, while the ring affords the necessary strength to prevent the chuck breaking or opening up under the strains of usage, it can still be manufactured approximately as cheaply as a cast iron chuck. Its practical utility is equal to that of a chuck having an all-steel or wrought metal body.

What I claim as new and desire to secure by Letters Patent is:

1. A chuck body having a continuous reinforcing ring embedded therein, jaws movably mounted in said body, and jaw adjusting screws engaging directly with said ring, substantially as set forth.

2. A cast metal chuck body having a reinforcing ring of stronger material partially embedded in the metal of the body and partially exposed, substantially as set forth.

3. A cast-iron chuck body having a steel reinforcing ring partially embedded in the metal of the body and partially exposed, substantially as set forth.

In witness whereof, I have affixed my signature, in presence of two witnesses, this 16th day of April, 1909.

HERMAN M. REYNOLDS.

Witnesses:
M. H. COLWAY,
A. H. BUTLER.